United States Patent [19]

Fankhauser

[11] Patent Number: 4,938,988

[45] Date of Patent: Jul. 3, 1990

[54] POULTRY SAUSAGE AND METHOD OF MAKING SAME

[75] Inventor: John H. Fankhauser, La Costa, Calif.

[73] Assignee: User Friendly Foods, Inc., Calif.

[21] Appl. No.: 264,192

[22] Filed: Oct. 28, 1988

Related U.S. Application Data

[63] Continuation-in-part of Ser. No. 111,104, Oct. 16, 1987, abandoned, which is a continuation-in-part of Ser. No. 622,995, Jun. 21, 1984, abandoned.

[51] Int. Cl.⁵ .............................................. A22C 11/00
[52] U.S. Cl. .................................... 426/644; 426/134; 426/646
[58] Field of Search .......................... 426/644, 646, 134

[56] References Cited

U.S. PATENT DOCUMENTS

| | | | |
|---|---|---|---|
| 2,853,389 | 9/1958 | Luchese | 426/644 |
| 2,916,381 | 12/1959 | Jumenko | 426/644 |
| 3,268,339 | 8/1966 | Torr | 426/646 |
| 3,529,972 | 9/1970 | Sutton | 426/644 |
| 3,547,656 | 12/1970 | Schlamb | 426/644 |
| 3,563,764 | 2/1971 | Posegate | 426/644 |
| 3,615,584 | 10/1971 | Schamb | 426/644 |

*Primary Examiner*—Carolyn Paden
*Attorney, Agent, or Firm*—Bernard L. Kleinke; William Patrick Waters; Jerry R. Potts

[57] ABSTRACT

A poultry sausage made from poultry meat without the use of binders is made by the grinding of the poultry meat together with selected ingredients in a single step through a fine plate of a meat grinder followed by a post grinding incorporation step in which the meat and ingredients are constantly mixed by means of a paddle mixer. An alternate embodiment of the invention includes a fowl wing having the inner limb deboned so that the meat with the skin of the inner limb forms a tube or container for the sausage meat or mixture.

22 Claims, 2 Drawing Sheets

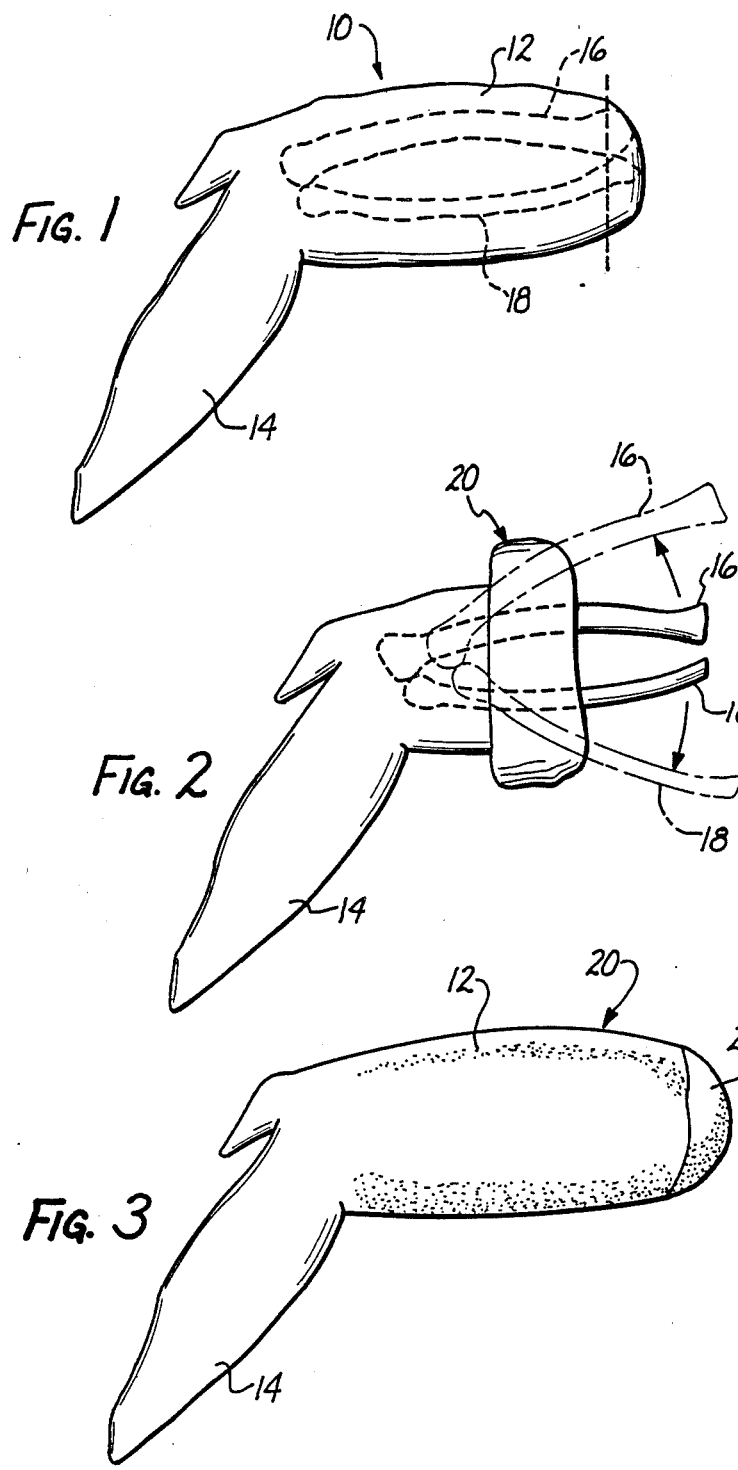

POULTRY SAUSAGE AND METHOD OF MAKING SAME

REFERENCE TO RELATED APPLICATIONS

This application is a continuation-in-part patent application of my co-pending patent application Ser. No. 111,104, filed Oct. 16, 1987, now abandoned, entitled "CHICKEN SAUSAGE AND METHOD OF MAKING SAME", which, in turn, is a continuation-in-part of my co-pending application Ser. No. 622,995, filed June 21, 1984, entitled "CHICKEN SAUSAGE AND METHOD OF MAKING SAME", now abandoned.

BACKGROUND OF THE INVENTION

The present invention relates to processed and prepared foods and pertains particularly to any improved sausage made substantially from poultry meat, such as chicken, and the method of making the same.

Sausages have been a popular food for many centuries. Sausages are typically made primarily from pork meat. A small percentage of sausages are made of beef meat. Sausages typically comprise a quantity of ground meat to which is added the desired spices to obtain the preferred flavoring. Pork and beef meat have been used almost exclusively in the manufacture of sausages, primarily because they have a natural binder, such that the meats thereof can be formed into patties and the like without the necessity of adding external binder.

Because of high fat and cholesterol content of beef and pork, much attention in recent years has been directed to the increased consumption of chicken in place of beef and pork. Chicken is traditionally a leaner meat than beef and pork and does not contain the high cholesterol levels. Poultry meat such as chicken and turkey, for example, are considered healthier than the pork and beef meats for this and other reasons.

One difficulty with the use of poultry meat, such as chicken, is that it does not contain natural binders such as fat, and cannot be formed into sausage in the traditional manner. The traditional manner of forming sausages involves the grinding of meat into small particles through a grinder, and then mixing the meat with the desired spices to provide the desired sausage flavoring and binders so that it can be formed into a cohesive mass. Beef and pork contain materials which form a natural binder, such that the ground meats are easily formed into patties and balls, and can be stuffed into linings without the ground combination crumbling and falling apart.

Sausages formed of poultry meat such as chicken have not been popular, because such meat does not contain natural binders and cannot be formed into sausage in the traditional manner. For example it is necessary, due to the structure of the chicken ground in a traditional fashion, to add binder to the ground meat in order to form the necessary cohesive sausage materials. Small quantities of pork meat have been traditionally added to chicken to provide the necessary binder.

Because of the desirability of maintaining pure food without the necessity of a binder, sausages containing poultry meat, such as chicken sausages have not been readily available in the past. It is undesirable to utilize binders due to the contaminating effect thereof. Unnecessary artificial additives or non-essential food additives tend to lessen the desirability of the sausage.

Among the known patents that are directed to the preparation of chicken are the following: U.S. Pat. No. 2,916,381, issued Dec. 8, 1959 to S. Jumenko, and entitled "Table Delicacy", which discloses a process of grinding chicken meat mixed with veal and stuffing the mixture into a chicken skin. The veal serves as a binder in the ground mixture.

The Luchese U.S. Pat. No. 2,853,389 discloses a process of deboning a chicken and stuffing it. Portions of the skin and flesh are kept intact for stuffing. The process includes disjointing the wing bones from the breast bone, and scraping the meat free of the wing bones and removing the wing bones. The stuffing for the chicken is molded into the shape of a chicken, and inserted into the boned poultry through the neck opening.

German Publication No. 1,936,634 of Bahr discloses a process of preparing sausages in which fifty to seventy percent of the poultry meat is crushed, rather than ground, and the remaining thirty to fifty percent is left in large lumps. The lumps and mince are mixed with salt and spices, and it is cooked in sausage cases, cans or jars. He also discloses that emulsifiers can be added to the mince part of the mix. He discloses that he avoids using fat additives, but does not disclose that he can form a cohesive mass, such as patties for cooking.

These, however, fail to suggest a process of making chicken sausages solely consisting substantially of poultry meat such as chicken meat that provides a cohesive mass without the use of binders.

It is, therefore, desirable that some method and means be available for the making of pure poultry sausages such as chicken sausages.

SUMMARY AND OBJECTS OF THE INVENTION

It is the primary object of the present invention to provide an improved chicken sausage.

In accordance with the primary aspect of the present invention, chicken sausage is made by a process of grinding the chicken meat in a single operation through a fine disc of a meat grinder, and thereafter mixing the necessary spices therewith. Another embodiment of the invention includes a chicken wing having the upper portion thereof deboned and the meat retained with the skin, and meat of the upper wing forming a tube for containing the sausage.

It is another object of the present invention to provide an improved sausage, in substantial part, from the meat of fowl or poultry, containing only natural ingredients and a method of making the same.

It is yet another object of the present invention to provide a poultry sausage comprised of natural ingredients having a suitable consistency, cohesiveness, and moisture content so as to be easily adapted to modern cooking techniques and aesthetically pleasing to the consumer.

It is a still further object of the present invention to provide a poultry based sausage, and the method for making the same, in which the desirable qualities of cohesiveness, consistency and moisture content can be retained, while the ingredients, and their respective proportions, can be varied.

In accordance with the objects of the present invention, with reference to chicken as the meat from which the sausage is made, recognizing that other suitable poultry meat may be substituted in the place of chicken, chicken sausage is made by a process of grinding the meat in a single operation, under constant uniform pressure. During the grinding process, other natural products are added to the chicken meat, thereby enhancing the consistency, cohesiveness and taste of the sausage.

In another form of the invention, a wing of chicken or of another member of the poultry group, is deboned leaving the meat and skin of the wing intact. In this condition, the wing is suitably adapted for the deposition therein of the inventive sausage produced by the process herein disclosed. The wing, stuffed with sausage, can be frozen and stored prior to the time it is cooked and consumed.

A distinct advantage of the present invention is that, as a result of the constant uniform grinding pressure herein disclosed, during which the natural ingredients are added to the poultry meat, a sausage is produced having a uniform consistency and a high degree of cohesiveness. In addition, it is aesthetically pleasing to the eye and to the taste. The hitherto unattainable consistency and cohesiveness achieved by the present invention is the result of the addition during the grinding process of selected natural ingredients in sufficient proportions as to eliminate the lack of consistency and cohesiveness previously experienced with ground poultry meat.

The above and other objects and advantages of the present invention will become apparent from the following description when read in conjunction with the drawings wherein:

FIG. 1 is a side elevation view of a typical chicken wing;

FIG. 2 is a view like FIG. 1, showing steps in the process of deboning the wing;

FIG. 3 is a view like FIG. 1 of a wing having been deboned with the meat retained and stuffed with a sausage.

DETAILED DESCRIPTION OF A PREFERRED EMBODIMENT

Figure 4:
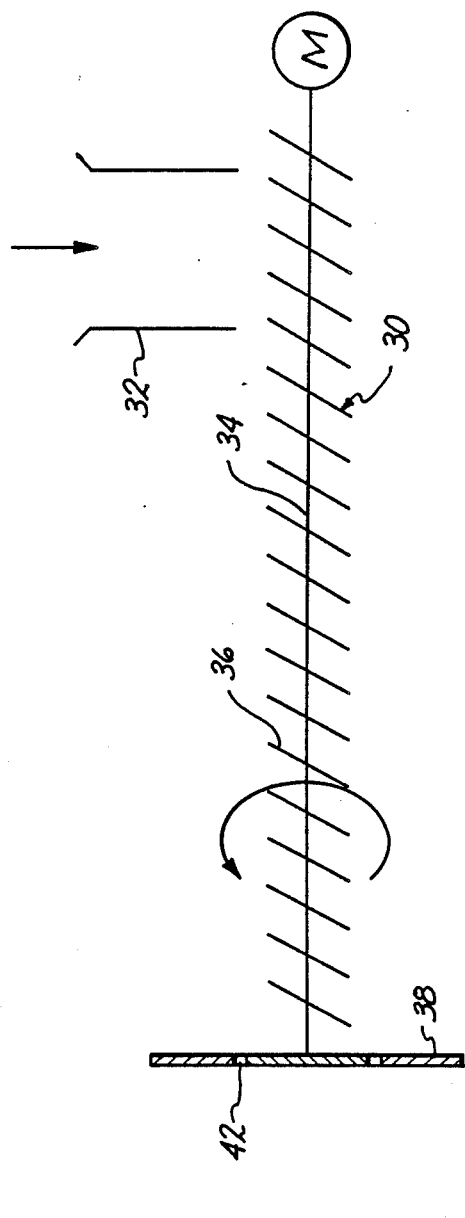
FIG. 4 is a schematic diagram of a grinder utilized in the present invention.

The present invention is directed to an improved poultry sausage, such as chicken sausage, and method of making the same. The improved sausage is made with the meat thereof consisting solely of ground meat of a fowl, such as chicken or the like. The preferred embodiment of the invention utilizes chicken meat as the sole meat ingredient of the sausage, with the meat ground in a novel manner, developed by applicant, which enables the ground chicken meat to form a natural bond or act as a selfbinding composition without the addition of external binders.

Due to the low fat content of fowl meat, such as chicken and turkey, many efforts have been made in the past to manufacture sausages from such meats. However, these efforts have failed in the attempts to manufacture the sausage with the fowl being the sole meat constituent of the sausage. In the past, the chicken meat has been mixed with a quantity of beef, veal, or pork to provide the binder. Where it is desired that pork or beef not be included, the chicken is provided with other binders, such as starch and the like, such that the meat can be formed into the necessary body such as a patty or the like.

I have developed a process of preparing the ground meat of chicken such that it has a binder quality without the necessity of adding additional binders. In my process, I have developed that the grinding of the meat through a fine hole disc of a meat grinder in a single step under high pressure results in a ground chicken meat having a cohesive or natural binding quality. As shown in FIG. 4, a meat grinder 28 having a fine disc or plate 38 as used herein means a meat grinder disc having one-eighth inch diameter holes, such as the hole or aperture 42, through which the meat is forced by means of a motor-driven anger 30. The holes are typically equally spaced around the surface of the disc.

In the past, attempts to grind chicken meat in a fashion similar to that for pork or beef has failed to produce a sausage having the necessary binding qualities. The prior art approach has been to grind the meat for sausage in a two step process, first a coarse grind, then a second finer grind. Meat is ground in this manner because forcing meat through a fine disc or plate of a grinder in the initial step requires an enormous amount of work compared to the two step process. For this reason, butchers usually use a two step (e.g. coarse grind followed by fine grind) process to provide finely ground meat for sausages and the like. While this process is satisfactory for pork and beef, it is not satisfactory for chicken in that it does not produce a chicken meat having a necessary cohesive or binding quality.

In my process of preparing the chicken sausage, I first select a desired quantity of chicken meat. The chicken is deboned, and cut into pieces so as to fit into the hopper 32 of the grinder 28. This (cutting) is not the same as or equivalent to passing it through a coarse grinder. The seasoning in the preferred process is then mixed with the chunks of chicken meat. The grinder 28 is then selected having the fine hole grinding disc or plate 38 (i.e. holes one-eighth inch in diameter).

A fine hole grinding plate is a term of art and has a known and specific meaning in the industry. The fine hole grinding plate is installed, and the meat of chicken and mixture of spices and other seasonings are passed through the grinder 28 in a single step process through the fine hole grinder plate 38 by means of a motor-driven, uniform pitch, high pressure auger 30. This produces a ground chicken meat having a binding quality, such that it can be formed into a body or cohesive mass, such as a sausage patty or ball. Such patties formed in this manner have been found to have sufficient cohesiveness or binding quality that they do not fall apart when formed into a patty.

The following examples more fully illustrate the invention, but it is not intended that the invention be limited to the exact procedures or concentrations utilized. Rather, it is intended that all equivalents obvious to those skilled in the art be included within the scope of the invention.

EXAMPLE 1

A sausage is produced by the steps of grinding the meat into the sausage after mixing the meat with the necessary spices and other ingredients to produce a sausage having the desired taste. As an example, in my process for producing a ten pound quantity of a particular flavored sausage, I select a quantity of ten pounds of chicken meat. The chicken meat is ground in the fashion as explained above (i.e. a single pass through a fine disc or plate or one-eighth inch diameter holes) to produce the ground meat having the desired binding quality. Grinding the meat is quite different from "crushing" a portion of it as in the German Publication of Bahl. Prior to grinding, the meat is mixed with the following ingredients to produce approximately ten pounds of sausage.

The ingredients are as follows: eight average size jalapeno peppers; one medium (eight ounce) onion; one small bunch (approximately one and one-half ounce) cilantro; two ounces of garlic; two ounces salt; one-half ounce white pepper; one-half ounce cayenne pepper; one-quarter ounce red chilies; one-quarter ounce cumin: and two ounces fennel seeds. The above ingredients ground to the appropriate size is mixed with the ground chicken meat to form the sausage material. Thereafter, the sausage can be formed in any form, such as a patty, ball, or the like, and thereafter cooked as desired for serving, thereby retaining its shape. Chicken meat is seasoned prior to being ground, thereby releasing desired juices from ingredients which contribute to produce cohesiveness necessary to accomplish binding.

EXAMPLE 2

80 parts by weight fowl thigh meat
10 parts by weight fowl skin
9 parts by weight spanish brown onion
1 part by weight jalapeño pepper.

The fowl meat can be chicken, turkey, goose, squab, cornish game hen, pheasant, guinea fowls, chucker, or mixtures thereof. Chicken meat is preferred.

In order to prepare the ingredients prior to introducing them to the grinder, the vegetables are first prepared. In this regard, the onions are peeled, and the stems are removed from the jalapeño peppers. Also, all of the ingredients are first cleaned by washing.

The thigh meat of the fowl is first boned and then it may be cut into convenient size pieces. The skin of the thigh is also used as well. The fowl meat and its skin are then mixed coarsely with the vegetables.

The mixtures are introduced into the hopper 32 of the grinder (FIG. 4). The uniform pitch, high pressure auger 30 then drives the mixture through the holes of the fine hole grinding plate 38 to form the sausage material.

The resulting sausage material can then be stuffed into sausage casings (not shown), or the sausage material can be formed into patties (not shown). Alternatively, as hereinafter described in greater detail, a fowl sausage can be stuffed into hollow fowl wings in accordance with the present invention.

In this example, the preferred meat is from the thigh portion of the chicken or other poultry, because, during the grinding process, the natural juices of the thigh meat enhances the binding characteristics of the sausage. All of these constituents are introduced into the high pressure grinder 28 of FIG. 4, at the same time. Prior to its introduction into the grinder, the stem of the jalapeño pepper is removed and the entire pepper is then placed in the grinder.

In this example, Spanish brown onion is preferred, because of its highly desirable sugar content and moisture. It has been found that the Spanish brown onion adds to the consistency of the finished product, and the condition of "weeping" is eliminated.

It has been found that by utilizing a constant high-pressure grinding of the mixture, that moisture is released from the jalapeno peppers, and onions. The moisture is uniformly distributed throughout the resulting fowl sausage.

It has also been found that the natural binding action is produced by the animal oil released from the fowl skin, together with capsicum in the cayenne pepper of the jalapeño pepper (serving as a catalyst), and the fructose of the onion. The onion fructose serves as a sticky substance. These fresh ingredients are all combined under the high pressure of the grinder with the thigh fowl meat natural juices to bind the resulting sausage material together in a highly cohesive manner.

If too high a quantity of the fowl skin is employed, the resulting taste is too oily. If too little quantities of the fowl skin is employed, the resulting product is too dry and not sufficiently cohesive.

Similarly, if too large a quantity of the onion is employed, the resulting product is not sufficiently cohesive. If too little of the onion is employed, the resulting product is too dry in that it is not sufficient cohesive. Furthermore, it is found that if too large a quantity of the jalapeno peppers are employed, the resulting product is unsuitably spicy to the taste. If too little a quantity of the jalapeño pepper is employed, the resulting product is also not suitably cohesive in consistency.

It is also been determined that any fresh chili pepper may be employed, in place of the jalapeño peppers. Also, if other onions are employed, refined sugar would need to be added, together with some water.

EXAMPLE 3

As a next example, where it is desirable to replace some or all of the thigh meat with white meat such as that from the breast of the chicken, the proportions of the first example would be varied wherein, in order to maintain the desired level of natural juices, the amount of meat would be reduced slightly while that of the skin would be increased.

EXAMPLE 4

As a further example wherein the sausage components are varied, the enzymatic qualities of jalapeño pepper can be duplicated by peppers from the Capsicum family and by the common chili pepper. These peppers are equivalent in the present invention to the jalapeño pepper but contribute their own significant taste to the final product.

EXAMPLE 5

In yet another example, wherein the components may be varied, other onions equivalent to the Spanish brown onion may be utilized. They must be of the type that have a high sugar content and moisture so as to give consistency to the finished product and to prevent the "weeping" condition.

Other examples wherein the components of the mix are varied with equivalents of the preferred ingredients substituted in their place will be readily apparent to one skilled in the art. For example, cumin, cilantro, fennel seeds, salt and garlic may be added to vary the taste of the finished product. In addition, various vegetables, beans and soy may be added without impairing the cohesiveness and consistency of the final product.

The meat/ingredient mixture is ground under high pressure. The grinding process is a single, continuous, non-interrupted process which, in addition to grinding the meat and the non-meat ingredients, produces a uniformly moist, consistent and cohesive mix which is adapted to be formed into patties or stuffed into casings or other suitable linings.

After the grinding step is complete, the sausage is subjected to a post grinding incorporation step wherein it is placed in a large open container and is constantly mixed by means of a paddle mixer. This process insures a uniform distribution of meat and other ingredients throughout the mix, and, in addition, it maintains uniform moisture throughout the mix.

The sausage mixture produced by the above described process is in a condition readily adaptable to be formed into patties, used as bulk stuffing for chicken, cornish games hens, turkeys and the like, or stuffed into casings. In addition, by varying the speed mixing during the post grinding incorporation stage, the consistency of the mix can be changed so that the final product can be in the form of the pate' or a tureen.

The present invention represents a number of significant improvements over the prior art. In addition to the achievement, hitherto unattainable, of a poultry meat sausage having suitable cohesiveness and consistency combined with good tasting and visually appealing qualities, the sausage produced by the present invention has been observed to cook about three times faster than the typical pork or beef sausage. This is due to the amount of moisture retained within the sausage mix as a result of the high pressure grinding to which it had been subjected.

In addition, the sausage produced by the present invention is adaptable for quick freezing thereby facilitating storage and handling. From a public health aspect, the sausage produced by the present invention is low in fat content. While poultry meat typically is lower in fat than the meat from animal sources, usually equalling approximately seven percent by weight of the poultry meat, after cooking, poultry sausage produced by means of the present invention has a fat content of approximately three percent by weight.

By means of the inventive process herein disclosed, chicken or other poultry sausage having the desirable qualities described herein can be prepared while the ingredients and their respective proportions may be varied to satisfy varying conditions and tastes.

In an alternate embodiment, a poultry wing sausage in the form of a chicken wing sausage is formed by the stuffing of a deboned section of a chicken wing with sausage mix. By this process, I form a chicken wing sausage wherein the outer wing section is left intact, with the inner section being deboned, and the meat thereof forms a tube which is stuffed with the sausage meat and spices.

Referring to FIG. 1 of the drawing, I select the outer two sections of a typical chicken wing, designated generally by the numeral 10, having the skin intact. The typical wing has a inner limb or section 12 and an outer limb or tip 14 joined together at a joint section, such that the outer tip typically extends out at an angle to the upper wing portion 12. The inner wing section includes two bones 16 and 18 shown in dotted lines. These bones are connected together at an outer end by cartilage. In my process, I cut across the ends of the bones, as shown by the dotted line, cutting the ends of the bones 16 and 18 and removing the connecting cartilage. Thereafter, I peel the skin and meat back, as shown in FIG. 2, with the skin and the meat forced back off of the bones 16 and 18.

After the meat and skin have been forced back to a position substantially as shown in FIG. 2, or substantially to the point of intersection of the inner and outer wing, I then separate the bones 16 and 18 forcing them outward such that the smaller bone 18 is easily popped out of its joint and removed. Thereafter, I force the skin and meat back slightly further, such that the larger bone 16 can then be popped out of its socket and out of the meat. I then remove the meat from the skin and thereafter roll the combined skin and meat back in its original configuration, thereby forming a sack or pocket that is essentially self-supporting.

The inner section of the wing forms a self-supporting tube structure that can be stuffed with sausage, and retains its original configuration without the need for molds and the like. I then select and stuff the tube formed of the upper wing meat and skin with a quantity of the sausage mix or material 22. This forms a chicken wing sausage such that it can be cooked, and thereafter the lower wing portion 15 forms a handle for grasping and holding the sausage for eating and the like. The edible inner wing section thus consists of a combination of chicken meat and sausage.

The edible stuffed wings produced in accordance with the present invention are each individually quick frozen so that each individual stuffed wing can be easily separated from others, in the frozen condition, immediately before it is cooked.

With reference now to FIG. 4, portions of fowl meat and selected ingredients are introduced into the auger at hopper 32. The fowl meat and the ingredients are mixed within the auger and the sausage material is forced through a plurality of holes in face plate 38. In the practice of the invention, the pitch of the auger blade 36 can vary from 40-50 degrees relative to the auger shaft 34. The preferred range of grinder pressure is 50-150 pounds per square inch, with a next preferred range of 90-110 pounds per square inch with the most preferred pressure being 100 pounds per square inch. With the grinder pressure at 100 pounds per square inch, the preferred auger blade pitch angle is about 45 degrees. With a pitch angle of 45 degrees and grinder pressure at about 100 pounds per square inch, moisture is forced from ingredients such as jalapeño peppers, chili peppers and onions and is distributed uniformly within the sausage mix.

It is to be understood that the foregoing mentioned grinder pressures are expressed relative to the grinder plate hole sizes. In this regard, at the preferred pressure of 100 pounds per square inch, a 5⅞ inch grinder plate having a 3/16 inch hole size. For different pressures, corresponding different hole sizes are used. For larger grinders, lower pressures are employed. At high grinder flow rates, lower pressures are employed. Overall, for a given grinder, sufficiently high pressure is developed to cause the desired incorporation of the ground ingredients to achieve the desired cohesive sausage consistency.

Because of the combination of the preferred pitch auger blade pitch angle and high pressure, the grinder operates at high speed and completes the grinding function in one operation as distinguished from typical sausage manufacturing processes which require as many as three grinding operations. For example, in the preparation of hot dogs, the meat and ingredients are ground at a lower pressure at an auger blade pitch angle of 60 degrees, and require three operations before the grinding process is complete.

While I have illustrated and described my invention by means of a specific embodiment, it is to be understood that numerous changes and modifications may be made therein without departing from the spirit and scope of the invention as defined in the appended claims.

I claim:

1. A method of making a poultry sausage from poultry meat without the use of artificial binders, comprising the steps of:

using fowl skin of a sufficient quantity for natural binding and moisture producing purposes;
using Spanish brown onion of a sufficient quantity for sticky, moist consistency purposes; and
grinding the poultry meat, fowl skin and onion together to release sufficient natural animal fat from the skin to be distributed uniformly throughout the resulting mixture to provide moisture therefor and to help bind it naturally cohesively together by reacting with the onion to cause the resulting mixture to adhere cohesively in a sausage consistency.

2. The method of claim 1 comprising:
stuffing the sausage into a casing formed of a poultry wing.

3. The method of making poultry sausage of claim 2 wherein:
the step of forming said casing comprises selecting the poultry wing; and
deboning a section of said wing, leaving the meat and skin of said section intact for forming said casing.

4. The method of claim 3 wherein the steps of deboning said wing section comprise the steps of:
cutting and separating the outer ends of the bones and removing said bones therefrom.

5. The method of claim 1 wherein said grinder operates between about 50 pounds per square inch and about 150 pounds per square inch.

6. The method of claim 1 wherein said grinder operates between about 90 pounds per square inch and about 110 pounds per square inch.

7. The method of claim 1 wherein said grinder operates at about 100 pounds per square inch.

8. The method of claim 1 wherein the pitch of the auger blade of said grinder is between about 40 degrees and about 50 degrees relative to the auger axis.

9. The method of claim 1 wherein the pitch of the auger blade of said grinder is about 45 degrees relative to the auger axis.

10. The method of claim 1 wherein the grinder face plate contains a plurality of holes having a diameter of one eighth inch.

11. A method of making chicken sausage from meat consisting essentially of the meat of a chicken comprising the steps of:
taking a quantity of chicken;
cutting the chicken meat into pieces for passing through the inlet hopper of a meat grinder;
selecting and mixing spices and flavoring with the pieces of chicken meat in a portion of about ten pounds of chicken meat, eight average size jalapeño peppers, one eight ounce Spanish brown onion, one and one-half ounce cilantro, two ounces of garlic, two ounces of salt, one-half ounce white pepper, one-half ounce cayenne pepper, one-fourth ounce red chilies, one-fourth ounce cumin, and two ounces fennel seeds;
forming the mixture of meat and spices into a cohesive mass by a process consisting essentially of passing said mixture of meat and spices solely through a fine blade grinder a single time, mixing said mass by stirring, thereby forming a cohesive chicken sausage mixture; and
forming the sausage mixture into portions for cooking.

12. The method of claim 11 comprising:
stuffing the sausage into a casing formed from a deboned inner section of a chicken wing.

13. The method of making chicken sausage of claim 12 wherein:
the step of forming said casing comprises selecting the outer two sections of the wing of a chicken; and
deboning the inner of said two sections of said wing for forming said casing.

14. Poultry sausage, comprising:
a ground mixture of poultry meat, and a natural binder composition, said natural binder composition including:
fowl skin of a sufficient quantity for binding and moisture producing purposes to provide sufficient natural animal fat released therefrom during grinding to be distributed uniformly throughout the mixture to help bind it naturally cohesively together and to provide moisture therefor; and
Spanish brown onion of a sufficient quantity to provide a sticky, moist consistency during grinding and to react with the animal fat of the fowl skin for natural binding purposes to cause the mixture to adhere cohesively in a sausage consistency.

15. Poultry sausage of claim 14, wherein the mixture comprises:
60 to 100 parts by weight of the poultry meat;
5 to 15 parts by weight of the poultry skin;
7 to 11 parts by weight of the onion; and
0.5 to 1.5 parts by weight of the jalepeno pepper.

16. Poultry sausage of claim 15, wherein the mixture comprises:
80 parts by weight of the poultry meat:
10 parts by weight of the poultry skin;
9 parts by weight of the onion; and
1 part by weight of the jalapeño pepper.

17. Poultry sausage according to claim 14, further including:
capsicum of a sufficient quantity to provide catalytic action between the skin and the onion.

18. A method of stuffing a poultry wing with poultry sausage according to claim 14:
selecting a poultry wing having an inner section containing two bones connected by cartilage, and an adjacent outer section;
cutting through the tip of said inner section opposite said outer section so as to cut through said bones at a location intermediate said cartilage and said adjacent outer section;
removing said tip and said cartilage;
disconnecting said bone from the meat portions of said wing;
removing said bones from said inner section thereby leaving an opening for the introduction therein of said poultry sausage; and
depositing a quantity of the poultry sausage within said opening to form the resulting stuffed poultry wing.

19. Poultry sausage made by a method, comprising:
using poultry meat, poultry skin, and Spanish brown onion; and
grinding the poultry meat, poultry skin and onion together to provide sufficient natural animal fat released therefrom during grinding to be distributed uniformly throughout the mixture to help bind it cohesively together and to provide moisture therefor; and to provide a sticky, moist consistency during grinding and to cause the animal fat and onion to react for natural binding purposes to cause the mixture to adhere cohesively in a sausage consistency.

20. Poultry sausage of claim 19, wherein said grinding includes introducing the mixture to a rotatably driven uniform pitch auger.

21. Poultry sausage of claim 20, wherein said auger has a uniform pitch of approximately 45 degrees.

22. Poultry sausage of claim 21, wherein said poultry meat is selected from the group consisting of chicken, turkey, goose, squab, cornish game hen, pheasant, guinea fowls, chucker, or mixtures thereof.

* * * * *